Patented Sept. 20, 1932

1,878,021

UNITED STATES PATENT OFFICE

FRIEDRICH STOLZ, OF FRANKFORT-ON-THE-MAIN-HOCHST, GERMANY, ASSIGNOR TO WINTHROP CHEMICAL COMPANY, INC., OF NEW YORK, N. Y., A CORPORATION OF NEW YORK

α-PARA-HYDROXYPHENYL-β-METHYLAMINOPROPANOL AND PROCESS OF PREPARING IT

No Drawing. Application filed June 21, 1929, Serial No. 372,798, and in Germany June 27, 1928.

The present invention relates to α-para-hydroxyphenyl-β-methylaminopropanol and to a process of preparing it.

I have found that α-para-hydroxyphenyl-β-methylaminopropanol $$HO.C_6H_4CH(OH).CH(CH_3).NH.CH_3,$$

which is important owing to its valuable therapeutic properties, can be prepared by hydrogenating a compound of the following formula:

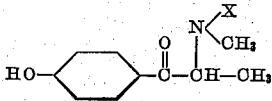

wherein X stands for hydrogen or the group $CH_2C_6H_5$.

The para-hydroxymethylaminopropiophenone can, for instance, be obtained by causing methylamine to act upon para-acetoxybromopropiophenone and in the same manner para-hydroxymethyl-benzylaminopropiophenone is obtained by the action of methylbenzylamine. The para-acetoxybrom-propiophenone is preferably obtained by brominating para-acetoxy-propiophenone in glacial acetic acid, chloroform or another suitable solvent.

I have furthermore found that α-para-hydroxyphenyl-β-methylaminopropanol can also be prepared by diazotizing para-aminophenyl-methylaminopropanol and heating the solution so obtained with or without addition of copper or another metal or a salt thereof.

Para-aminophenyl-methylaminopropanol can, for instance, be obtained from para-acetylamino-α-methylaminopropiophenone by first reducing it catalytically and then saponifying the reduced compound or first saponifying it and then reducing the saponified compound.

Para-acetylamino-α-methylaminopropiophenone can be obtained by causing monomethylamine in an aqueous alcoholic solution to act upon α-brompropionyl-acetanilide (prepared from acetanilide and α-brompropionylchloride by means of aluminum chloride). The solvent is distilled off in vacuo and the reaction product which remains is neutralized with alcoholic hydrocholric acid, whereupon the hydrochloride of the para-acetylamino-α-methlyaminopropiophenone precipitates in the form of a crystal powder.

The following examples serve to illustrate the invention, but they are not intended to limit it thereto.

(1.) 269 parts of para-hydroxymethylbenzylaminopropiophenone of the following formula:

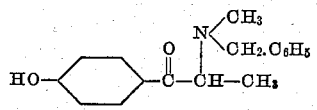

are dissolved in 1000 parts of normal hydrochloric acid. After addition of a nickel catalyst, the whole is hydrogenated for one hour at 100° C. and under a pressure of hydrogen of 40 atmospheres. After cooling, the solution which has been separated from the toluene split off and from the catalyst is acidified, and shaken out several times with ether, in order to remove the non-basic parts, then the whole is neutralized and some dissolved iron and nickel is precipitated with the required quantity of ammonium sulfide. To the filtrate is added a sufficiently concentrated potassium carbonate solution, whereupon, when rubbing with a glass rod, the new base precipitates in the form of a crystalline powder. After standing for some time in ice it is filtered by suction and washed with cold water. From the filtrate there can also be obtained an isomeric base.

The para-hydroxyphenylmethylaminopropanol thus prepared forms a white crystalline powder, melting at 152° C.–154° C. It is difficulty soluble in water, alcohol and ether and is readily soluble in caustic soda solution and diluted acids. The hydrochloride melts at 209° C.–211° C.; and is readily soluble in water with a neutral reaction.

Instead of by means of nickel catalysts, the hydrogenation can also be carried out with palladium at ordinary temperature.

Instead of 269 parts of para-hydroxymethylbenzylaminopropiophenone, 179 parts of para-hydroxymethylaminopropiophenone dissolved in 1000 parts by volume of normal hydrochloric acid can likewise be used for the reduction with a nickel catalyst. The solution separated from the catalyst can be worked up in the manner above indicated.

(2.) 18 parts of para-aminophenyl-methylaminopropanol of the following formula:

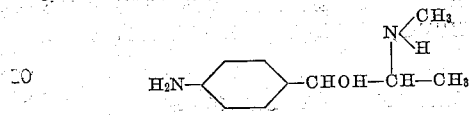

are dissolved with 9 parts of sulfuric acid of 20% strength in 36 parts of water, the solution is cooled with ice and diazotized by the addition of 10 parts by volume of normal nitrite solution. Then some copper powder is added thereto and the whole is heated on the vapor bath until the evolution of nitrogen which soon takes place, is finished and a test sample no longer couples with β-naphtholdisulfonic acid. By means of an excess of caustic soda solution, dissolved copper is precipitated, which is filtered off. The filtrate is neutralized with carbonic acid or a mineral acid and then the para-hydroxyphenylmethylaminopropanol is precipitated in the form of a white crystalline powder by addition of ample potassium carbonate. It is difficultly soluble in water, alcohol and ether and melts at 152° C.-154° C. By neutralization with alcoholic hydrochloric acid the hydrochloride is obtained being readily soluble in water with a neutral reaction and difficultly soluble in alcohol; it melts at 209° C.-211° C. The oxalate is readily soluble in hot water and crystallizes when slowly cooled in fine crystals, melting at 216° C.-218° C. The base is readily soluble in diluted caustic soda solution.

(3.) 28 parts of para-aminophenyl-methylaminopropanol sulfate are dissolved in 250 parts of water, 50 parts of sulfuric acid of 20% strength are added thereto and the mixture is diazotized by means of 100 parts by volume of normal nitrite solution. Then the whole is gently heated on the steam bath until a test sample no longer couples with β-naphtholdisulfonic acid. When the liquid no longer couples with β-naphtholdisulfonic acid even on a further addition of nitrite, the reaction is finished. Then the whole is filtered, the filtrate is supersaturated with a potassium carbonate solution and the resulting para-hydroxyphenyl-methylaminopropanol is shaken out with acetic ester. The base remaining after distillation of the acetic ester is neutralized with alcoholic hydrochloric acid and the resulting hydrochloride is recrystallized from alcohol; it melts at 209° C.-211° C.

(4.) 14 parts of the sulfate of para-aminophenyl-methyl-aminopropanol are dissolved in 150 parts of water, 30 parts of sulfuric acid of 20% strength are added thereto, the mixture is cooled with ice and diazotized by means of 50 parts by volume of a normal nitrite solution. After the addition of a small quantity of reduced nickel, the whole is heated on the steam bath until the evolution of nitrogen is finished and a test sample no longer couples with β-naphtholdisulfonic acid. When a diazotizable base is no longer present, the whole is filtered, caustic soda solution is added until there is a neutral reaction to Congo paper and any dissolved nickel is precipitated by cautiously adding a sodium sulfide solution. The precipitate of nickel sulfide is filtered, the filtrate is supersaturated with a potassium carbonate solution and the para-hydroxyphenyl-methylaminopropanol is shaken out with acetic ester. The hydrochloride prepared therefrom melts at 209° C.-211° C.; it is readily soluble in water with a neutral reaction.

(5.) 90 parts of para-aminophenyl-methylaminopropanol are dissolved together with 450 parts of sulfuric acid of 20% strength in 1500 parts of water and, while cooling with ice, diazotized by means of 500 parts by volume of a normal nitrite solution. Then a solution of 5 parts of cobaltous-chloride is added thereto and the whole is gradually heated on the vapor-bath until no more nitrogen escapes and a test sample does no longer couple with β-naphtholdisulfonic acid. When the reaction is complete the liquid is neutralized with caustic soda solution until Congo paper is no longer blued and then the cobalt is precipitated by the just required quantity of a sodium sulfide solution. Then the mass is filtered, rendered alkaline by means of ammonia and the para-hydroxyphenyl-methylaminopropanol is shaken out with acetic ester by means of ammonium sulfate. The base remaining after the distillation of the solvent is purified by transforming it into the hydrochloride.

I claim:

1. The process which consists in hydrogenating a compound of the following formula:

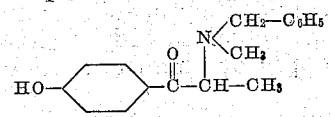

dissolved in the required quantity of normal hydrochloric acid, in the presence of a nickel catalyst for one hour at 100° C. and under a pressure of hydrogen of 40 atmospheres.

2. As a new product, the compound of the following formula:

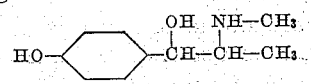

being a white crystalline powder, melting at 152° C.-154° C., being difficultly soluble in water, alcohol and ether, readily soluble in caustic soda solution and diluted acids, the hydrochloride melting at 209° C.–211° C. and being readily soluble with a neutral reaction.
3. The process which consists in hydrogenating a salt of a base of the following general formula:
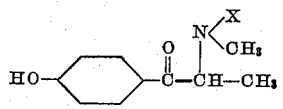
wherein X stands for hydrogen or the group $CH_2.C_6H_5$, in an aqueous solution and in the presence of a hydrogenation catalyst.
In testimony whereof, I affix my signature.
FRIEDRICH STOLZ.